(12) United States Patent
Kita (10) Patent No.: US 11,743,398 B2
(45) Date of Patent: Aug. 29, 2023

(54) SYSTEM FOR EFFICIENTLY MIGRATING CONTENT DATA

(71) Applicant: FUJIFILM BUSINESS INNOVATION CORP., Tokyo (JP)

(72) Inventor: Tatsuomi Kita, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 553 days.

(21) Appl. No.: 16/786,439

(22) Filed: Feb. 10, 2020

(65) Prior Publication Data

US 2021/0067639 A1    Mar. 4, 2021

(30) Foreign Application Priority Data

Aug. 28, 2019 (JP) ................. 2019-155881

(51) Int. Cl.
*H04N 1/00* (2006.01)
*H04N 1/32* (2006.01)

(52) U.S. Cl.
CPC ..... *H04N 1/00244* (2013.01); *H04N 1/32358* (2013.01)

(58) Field of Classification Search
None
See application file for complete search history.

(56) References Cited

U.S. PATENT DOCUMENTS

| 9,965,473 B2 | 5/2018 | Soga |
| 2009/0150414 A1* | 6/2009 | McClanahan ....... G06F 16/1744 |
| 2009/0271455 A1* | 10/2009 | Nagarajan ........... G06F 16/9535 |
| | | 707/999.102 |
| 2011/0107198 A1 | 5/2011 | Kuroda |
| 2018/0152505 A1* | 5/2018 | Averett ................. H04L 67/566 |

FOREIGN PATENT DOCUMENTS

| JP | 3666921 B2 | 6/2005 |
| JP | 2011-095997 A | 5/2011 |
| JP | 2015-087912 A | 5/2015 |
| JP | 6230317 B2 | 11/2017 |

* cited by examiner

*Primary Examiner* — Lennin R Rodriguezgonzalez
(74) *Attorney, Agent, or Firm* — Oliff PLC (57) ABSTRACT

An information processing apparatus includes an acquisition unit and a copying unit. The acquisition unit acquires a file structure at a migration source and identification information to identify a file at the migration source, and the copying unit copies the file structure and the identification information to a migration destination before migrating content data of one or more files at the migration source.

11 Claims, 9 Drawing Sheets

Estimated Amount of Time for Migration   20 hours and 30 minutes

Migration Settings
  Conversion Option
    ○ No Conversion   ⊙ Compression   ○ One Page Only   ○ Index Image   ○ Printed Image Method to Specify Conversion Target
    ☐ Specify Based on Registration Date and Time    01/01/2018
    ☑ Specify Based on Access Date and Time          01/01/2019
    ☑ Specify Based on Attribute Value    Attribute  Drawing Number   Value  XE*
    ☑ Latest Version Compression Method
    ⊙ Lossy Compression (Image Size Reduced)     50   % Reduction
    ○ Lossy Compression (No Change in Image Size)
    ○ Lossless Compression Set    Calculate    Cancel

SYSTEM FOR EFFICIENTLY MIGRATING CONTENT DATA

CROSS-REFERENCE TO RELATED APPLICATIONS

This application is based on and claims priority under 35 USC 119 from Japanese Patent Application No. 2019-155881 filed Aug. 28, 2019.

BACKGROUND

(i) Technical Field

The present disclosure relates to an information processing apparatus, an information processing system, and a non-transitory computer readable medium storing an information processing program.

(ii) Related Art

Japanese Patent No. 3666921 proposes a document-information copying apparatus that copies to a second memory unit a specified range of document information stored in a first memory unit when the range is specified. When copying the specified range of document information, the document-information copying apparatus creates in the second memory unit symbolic-image information to be used to search for the document information. In accordance with the symbolic-image information, which is created, the document-information copying apparatus creates management information to manage the document information, which is copied.

Japanese Unexamined Patent Application Publication No. 2015-087912 proposes a system in which a document management apparatus at a migration source exports data containing a plurality of pages by archiving and exporting a content file and an accompanying information file for each page contained in the data and a document management apparatus at a migration destination acquires and displays the file archived for each page.

Japanese Unexamined Patent Application Publication No. 2011-095997 proposes an information processing apparatus that sequentially sets each folder managed by a first document management system as a registration target folder and that determines whether a depth of the registration target folder is equal to or less than a limit value of a depth of folder hierarchy. If the depth of the registration target folder is determined to be equal to or less than the limit value of the depth, the apparatus registers the registration target folder at a position, in a folder hierarchy managed by a second document management system, which corresponds to a position in a folder hierarchy managed by the first document management system. In contrast, if the depth of the registration target folder is determined to exceed the limit value of the depth, the apparatus registers the registration target folder in a shallow layer in the folder hierarchy managed by the second document management system.

Japanese Patent No. 6230317 proposes a system in which data stored in a first information processing apparatus is migrated to a second information processing apparatus. Specifically, the first information processing apparatus includes an export unit configured to export migration target data that is stored in a storing unit and a recording unit configured to record time information indicating the time of exporting performed by the export unit, and the export unit furthermore compares the time information and information regarding an update date of the data stored in the storing unit and exports data updated at or subsequent to the time indicated by the time information as a difference migration target.

SUMMARY

When a document management system is migrated, a known technique creates a complete copy and a differential copy of the entire system to migrate the system. However, while the complete copy of the entire system is being created, the system needs to be shut down, and the system shutdown period is sometimes prolonged in proportion to the amount of data. Aspects of non-limiting embodiments of the present disclosure relate to providing an information processing apparatus, an information processing system, and a non-transitory computer readable medium storing an information processing program that enable the system shutdown period during migration of a document management system to be shortened compared with the case where a complete copy of the files in the entire system is created.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including an acquisition unit and a copying unit. The acquisition unit acquires a file structure at a migration source and identification information to identify a file at the migration source, and the copying unit copies the file structure and the identification information to a migration destination before migrating content data of one or more files at the migration source.

BRIEF DESCRIPTION OF THE DRAWINGS

Exemplary embodiments of the present disclosure will be described in detail based on the following figures, wherein.

DETAILED DESCRIPTION

Figure 1:
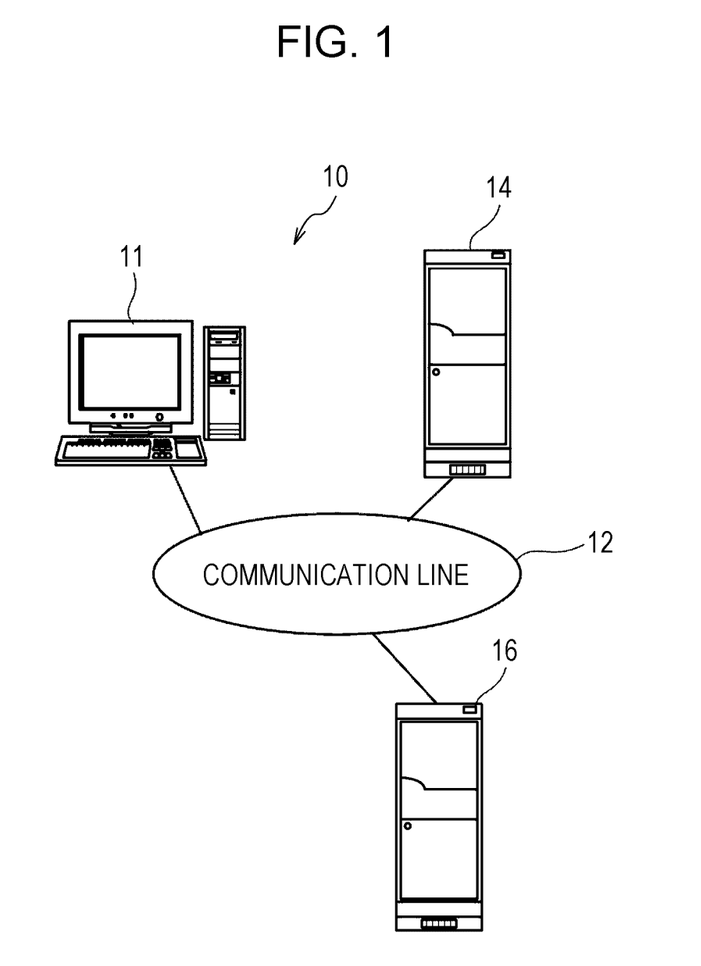
FIG. 1 is an illustration depicting a schematic configuration of an information processing system according to each of the present exemplary embodiments.

Hereinafter, examples in the present exemplary embodiments will be described in detail with reference to the drawings. In each of the present exemplary embodiments, an information processing system in which an information processing terminal and a plurality of servers are connected to each other via a communication line, such as various kinds of networks, will be described as an example. FIG. 1 is an illustration depicting a schematic configuration of an information processing system 10 according to each of the present exemplary embodiments.

The information processing system 10 according to each of the present exemplary embodiments includes an information processing terminal 11, a cloud server 14, which serves as an information processing apparatus, and a server 16, which serves as a migration-source manager, as depicted in FIG. 1. In each of the present exemplary embodiments, an example of the information processing system 10 that includes a single information processing terminal 11, a single cloud server 14, and a single server 16 is described, but the information processing system 10 may include one or more information processing terminals 11, one or more cloud servers 14, and one or more servers 16.

The information processing terminal 11, the cloud server 14, and the server 16 are connected to each other via a communication line 12, such as a local area network (LAN), a wide area network (WAN), the Internet, or an intranet. The information processing terminal 11, the cloud server 14, and the server 16 are capable of transmitting and receiving various kinds of data to and from each other via the communication line 12.

In the information processing system 10 according to each of the present exemplary embodiments, the cloud server 14 provides a system migration service and a document management service as a cloud service. The system migration service performs, for example, a process in which a system such as a document management system that is set up in the server 16 located on premises is migrated to a document management system provided by the cloud server 14 or to a different system such as the information processing terminal 11. In each of the present exemplary embodiments, system migration is described under the assumption that a system at a migration source is copied to a migration destination, but a system at a migration source may be migrated to a migration destination without retaining the system at the migration source.

Figure 2:
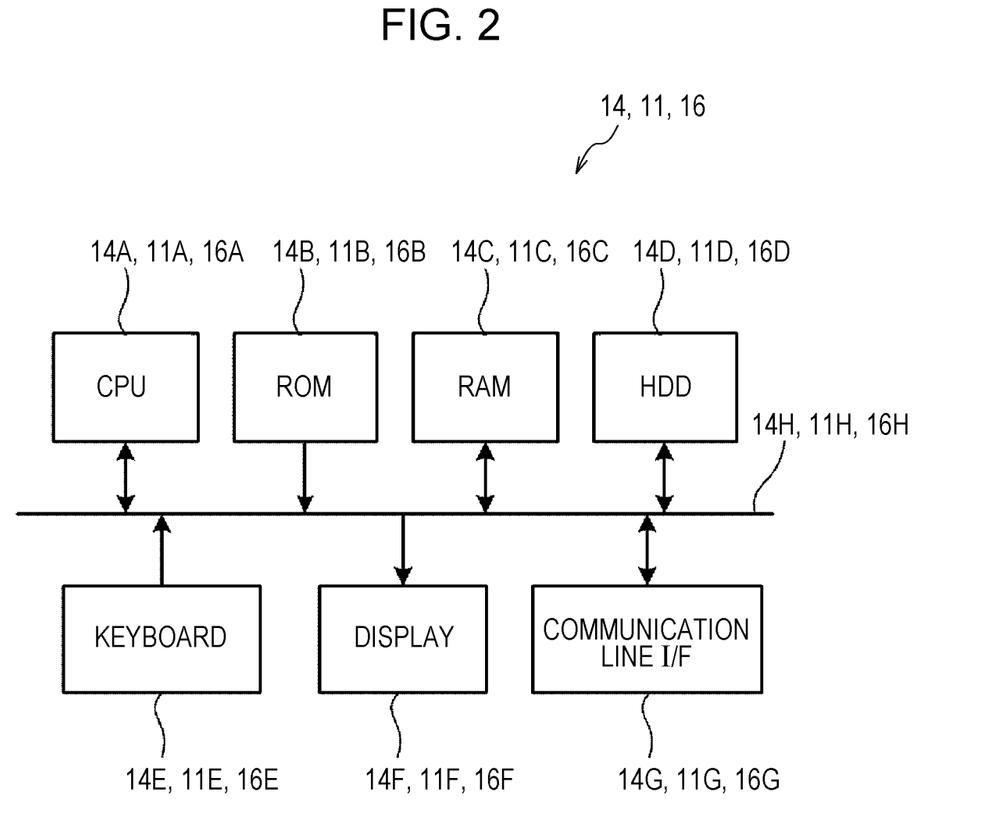
FIG. 2 is a block diagram depicting a configuration of major electrical components of each of an information processing terminal, a cloud server, and a server in the information processing system according to each of the present exemplary embodiments.

Next, a configuration of major electrical components of each of the information processing terminal 11, the cloud server 14, and the server 16 according to each of the present exemplary embodiments will be described. FIG. 2 is a block diagram depicting a configuration of major electrical components of each of the information processing terminal 11, the cloud server 14, and the server 16 in the information processing system 10 according to each of the present exemplary embodiments. The information processing terminal 11, the cloud server 14, and the server 16 each are basically designed to have a configuration of a general-purpose computer, and thus the cloud server 14 will be described as a representative example.

The cloud server 14 according to each of the present exemplary embodiments includes a central processing unit (CPU) 14A, a read-only memory (ROM) 14B, a random-access memory (RAM) 14C, a hard disk drive (HDD) 14D, a keyboard 14E, a display 14F, and a communication line interface (I/F) 14G, as depicted in FIG. 2. The CPU 14A manages the entire operation of the cloud server 14. The ROM 14B stores various control programs, various parameters, and the like in advance. The RAM 14C is used as a work area and the like while the CPU 14A executes various programs. The HDD 14D stores various kinds of data, application programs, and the like. The keyboard 14E is used for inputting various kinds of information. The display 14F is used for displaying various kinds of information. The communication line I/F 14G is connected to the communication line 12 and transmits and receives various kinds of data to and from other apparatuses connected to the communication line 12. All the above units in the cloud server 14 are electrically connected to each other via a system bus 14H. In the cloud server 14 according to each of the present exemplary embodiments, although the HDD 14D is adopted as a storage unit, this is not meant to be limiting, and a different nonvolatile storage unit, such as a flash memory, may be adopted.

In the above configuration of the cloud server 14 according to each of the present exemplary embodiments, the CPU 14A performs access to the ROM 14B, the RAM 14C, and the HDD 14D, acquisition of various kinds of data via the keyboard 14E, and display of various kinds of information on the display 14F. The cloud server 14 also controls transmission and reception of communication data via the communication line I/F 14G by using the CPU 14A.

In the information processing system 10 according to each of the present exemplary embodiments, the information processing system 10 being configured in this way, the cloud server 14 provides the system migration service and the document management service as a cloud service, as described above. In the following description, a case where the system migration service migrates a migration-source document management system 17 that is set up in the server 16 to a document management service provided by the cloud server 14 (hereinafter referred to as a migration-destination document management system 18) will be described as an example.

When files in a document management system at a migration source are migrated, a known technique creates a complete copy and a differential copy of the entire system to migrate the system. However, while the complete copy of the entire system is being created, the system needs to be shut down. Further, the system shutdown period is sometimes prolonged in proportion to the amount of data. Thus, in each of the present exemplary embodiments, the file structure at a migration source and the identification information to identify a file at the migration source are copied to a migration destination before the content data of one or more files at the migration source is migrated. In this way, once the file structure and the identification information are copied to the migration destination, the system at the migration destination is able to operate, and the system shutdown period is shortened compared with a case where the complete copy of the entire system is created.

First Exemplary Embodiment

Figure 3:
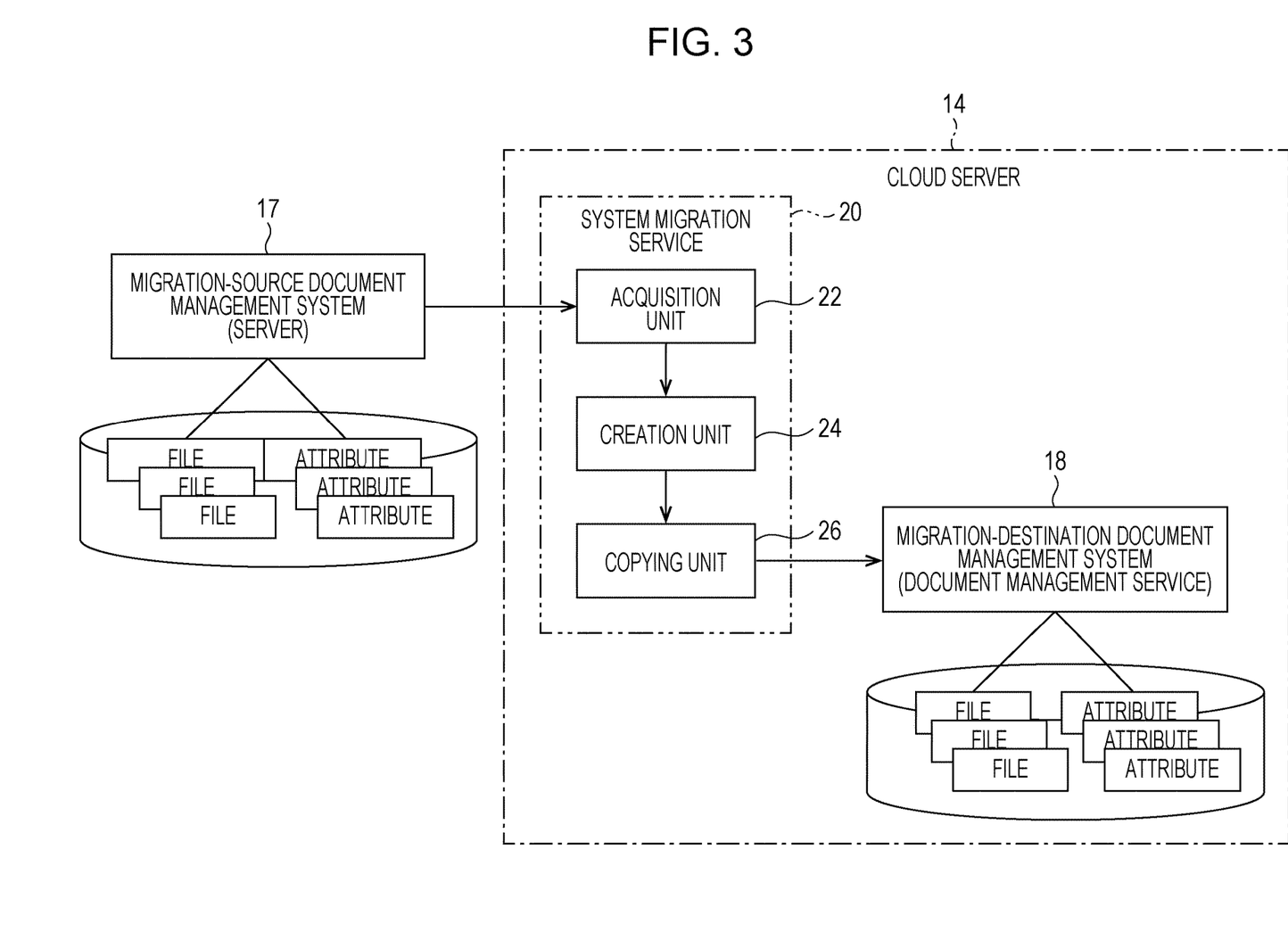
FIG. 3 is a functional block diagram depicting a functional configuration of an information processing system according to a first exemplary embodiment.

A detailed functional configuration of the information processing system 10 according to a first exemplary embodiment will be described. FIG. 3 is a functional block diagram depicting a functional configuration of the information processing system 10 according to the present exemplary embodiment.

As described above, the cloud server 14 according to the present exemplary embodiment provides as a cloud service a system migration service 20 and the migration-destination document management system 18, which serves as a migration-destination manager.

The system migration service 20 migrates to the migration-destination document management system 18 a plurality of files and attributes of the plurality of files, both of which are managed by the migration-source document management system 17, together with the file structure including a hierarchical structure of the files.

The system migration service 20 includes functions of an acquisition unit 22, a creation unit 24, and a copying unit 26, as depicted in FIG. 3.

The acquisition unit 22 acquires from the migration-source document management system 17 a file structure, which includes a hierarchy of files and a tree structure at the migration source, and identification information to identify a file. The acquisition unit 22 may simultaneously acquire attribute information of files. Examples of the attribute information include a registration date, an access date, a drawing number, a file type, and a document type.

The creation unit 24 creates recognition information with which a file in the migration-source document management system 17 is recognizable. Examples of the recognition information created by the creation unit 24 include a downsized file obtained from the original file by using a method such as compression, a thumbnail image of a file, a compressed image, document information regarding the first page, an image of the first page, and a partial image.

The copying unit 26 copies the file structure and the identification information, which are acquired by the acquisition unit 22, to the migration-destination document management system 18. Subsequently, the copying unit 26 also stores the recognition information, which is created by the creation unit 24, in corresponding locations of the file structure and the identification information, which have been copied. Then, the copying unit 26 migrates the system by sequentially copying content data of the files in the migration-source document management system 17 to corresponding locations of the file structure and the identification information, which have been copied. The attribute information may also be copied to the migration-destination document management system 18 when the file structure and the identification information are copied to the migration-destination document management system 18.

The creation unit 24 and the migration of the recognition information to the migration destination may be omitted. The copying unit 26 corresponds to a data acquisition unit and a data copying unit.

Figure 4:
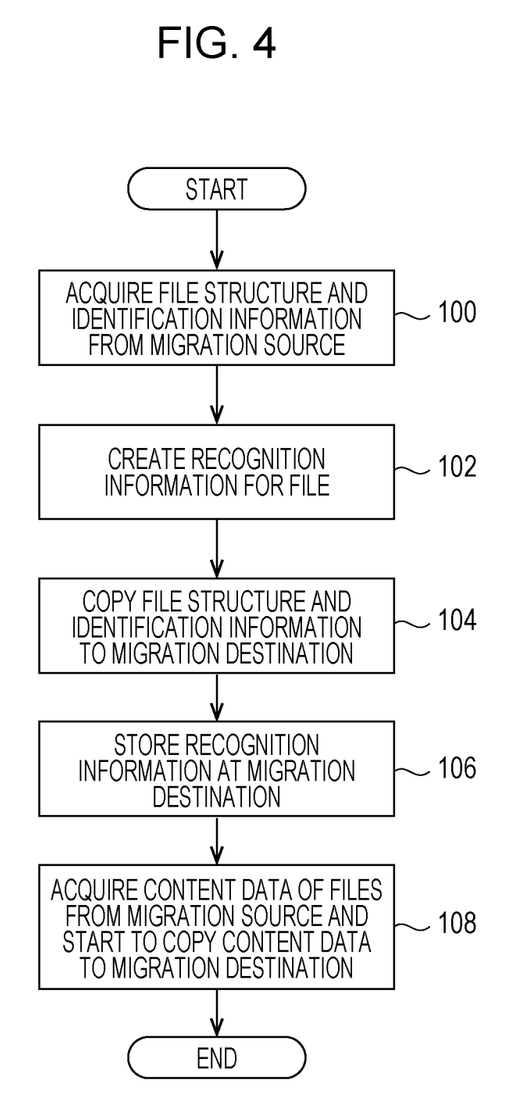
FIG. 4 is a flowchart depicting an example flow of a process performed by a system migration service of a cloud server in the information processing system according to the first exemplary embodiment.

Next, a process performed by the system migration service 20 of the cloud server 14 in the information processing system 10 according to the present exemplary embodiment, the information processing system 10 being configured as described above, will be described. FIG. 4 is a flowchart depicting an example flow of a process performed by the system migration service 20 of the cloud server 14 in the information processing system 10 according to the present exemplary embodiment. The process depicted in FIG. 4 starts, for example, when a user specifies the migration-source document management system 17 and the migration-destination document management system 18 and provides instructions to migrate the system.

In step 100, the acquisition unit 22 acquires a file structure and identification information to identify a file from the migration-source document management system 17, and the process proceeds to step 102.

In step 102, the creation unit 24 creates recognition information with which a file in the migration-source document management system 17 is recognizable, and the process proceeds to step 104.

In step 104, the copying unit 26 copies to the migration-destination document management system 18 the file structure and the identification information, which have been acquired, and the process proceeds to step 106. Once the file structure and the identification information are copied to the migration-destination document management system 18, the file structure and the identification information are viewable, and thus the migration-destination document management system 18 is able to operate.

In step 106, the copying unit 26 stores the recognition information, which is created by the creation unit 24, in corresponding locations of the file structure and the identification information, which have been copied to the migration-destination document management system 18, and the process proceeds to step 108.

In step 108, the copying unit 26 acquires content data of files from the migration-source document management system 17 and sequentially starts to copy the content data to the migration-destination document management system 18, and a series of procedures is finished.

In this way, once the file structure and the identification information are copied before the content data is migrated to the migration-destination document management system 18, the migration-destination document management system 18 is able to operate, although corresponding content data may be inaccessible in some cases.

Figure 5:
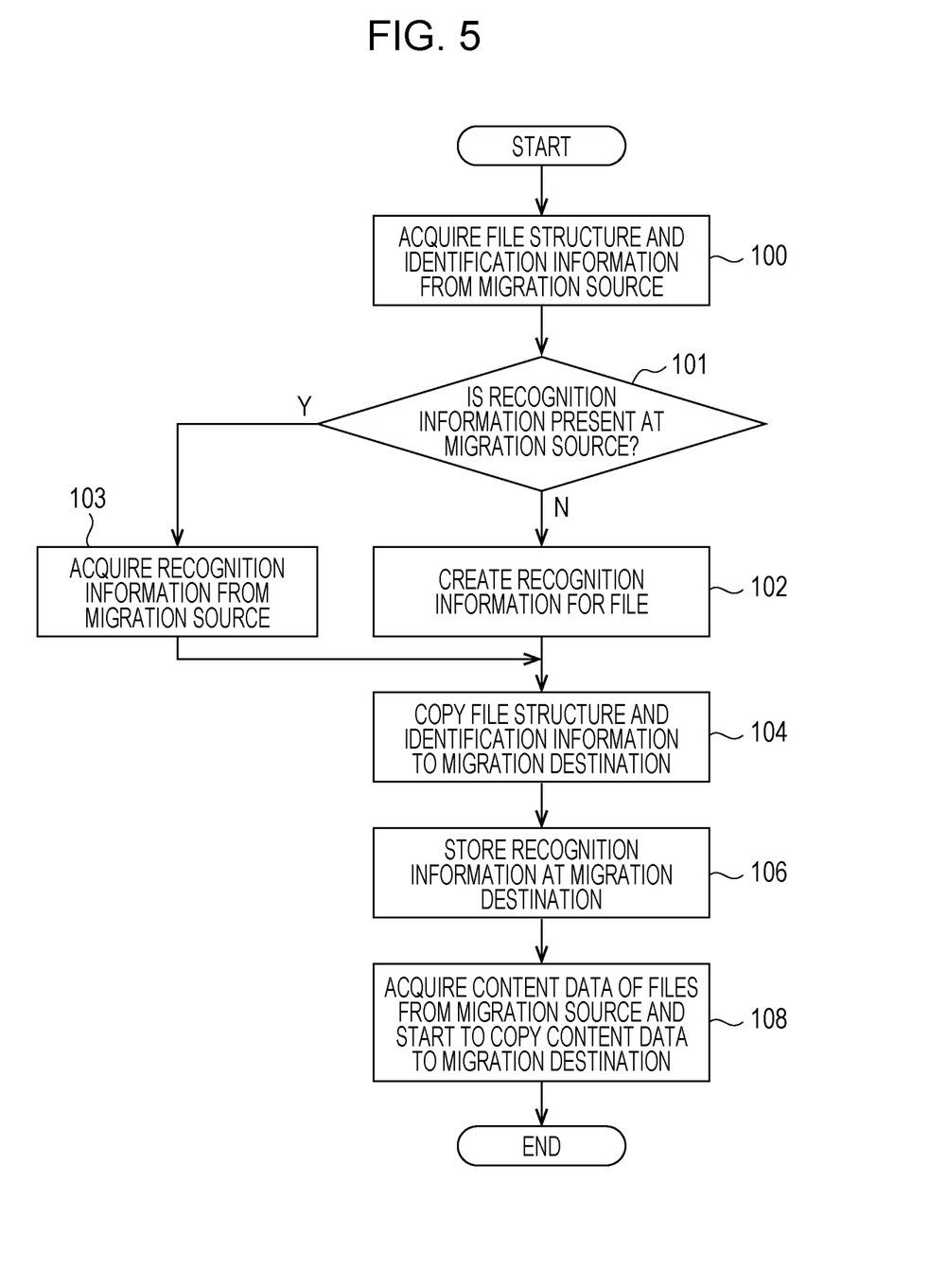
FIG. 5 is a flowchart depicting a modification of the flow of the process performed by the system migration service of the cloud server in the information processing system according to the first exemplary embodiment.

Next, a modification of the process performed by the system migration service 20 will be described. FIG. 5 is a flowchart depicting a modification of the flow of the process performed by the system migration service 20 of the cloud server 14 in the information processing system 10 according to the present exemplary embodiment. The process depicted in FIG. 5 starts, for example, when a user specifies the migration-source document management system 17 and the migration-destination document management system 18 and provides instructions to migrate the system. In the following description, like symbols are attached to procedures that are the same as or similar to the procedures depicted in FIG. 4.

In step 100, the acquisition unit 22 acquires a file structure and identification information to identify a file from the migration-source document management system 17, and the process proceeds to step 101.

In step 101, the creation unit 24 determines whether recognition information is present in the migration-source document management system 17. In other words, it is determined whether the creation of recognition information by the creation unit 24 is unnecessary. If a negative determination is made in step 101, the process proceeds to step 102. If an affirmative determination is made in step 101, the process proceeds to step 103.

In step 102, the creation unit 24 creates recognition information with which a file in the migration-source document management system 17 is recognizable, and the process proceeds to step 104.

In step 103, the creation unit 24 acquires recognition information from the migration-source document management system 17, and the process proceeds to step 104.

In step 104, the copying unit 26 copies to the migration-destination document management system 18 the file structure and the identification information, which have been acquired, and the process proceeds to step 106. Once the file structure and the identification information are copied to the migration-destination document management system 18, the file structure and the identification information are viewable, and thus the migration-destination document management system 18 is able to operate.

In step 106, the copying unit 26 stores the recognition information, which is created by the creation unit 24, or the recognition information, which is acquired from the migration source, in corresponding locations of the file structure and the identification information, which have been copied to the migration-destination document management system 18, and the process proceeds to step 108.

In step 108, the copying unit 26 acquires content data of files from the migration-source document management system 17 and sequentially starts to copy the content data to the migration-destination document management system 18, and a series of procedures is finished.

In the process depicted in FIG. 4, recognition information is created even when the recognition information is already present in the migration-source document management system 17, but recognition information is not created in the process depicted in FIG. 5 when the recognition information is present in the migration-source document management system 17. In this way, an increase in the amount of unnecessary information is reduced or suppressed.

Second Exemplary Embodiment

Figure 6:
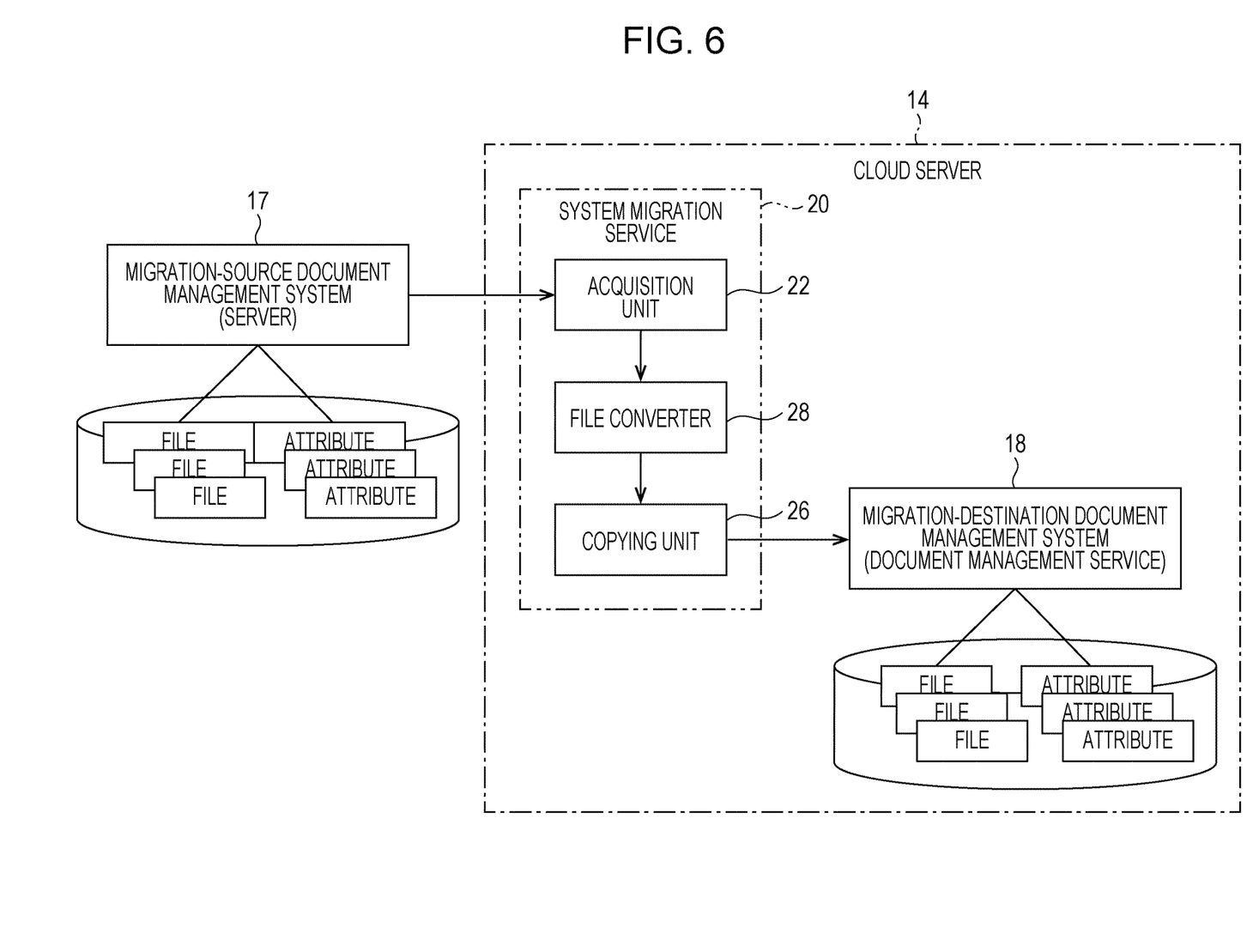
FIG. 6 is a functional block diagram depicting a functional configuration of an information processing system according to a second exemplary embodiment.

Next, a detailed functional configuration of the information processing system 10 according to a second exemplary embodiment will be described. FIG. 6 is a functional block diagram depicting a functional configuration of the information processing system 10 according to the present exemplary embodiment. Like symbols are attached to elements that are the same as or similar to the elements depicted in FIG. 3, and detailed descriptions regarding such elements will be omitted.

In the above embodiment, the creation unit 24 creates the recognition information with which a file is recognizable, but a file converter 28, which serves as a converter, is provided instead of the creation unit 24 in the present exemplary embodiment.

In accordance with conversion settings configured in advance by a user, the file converter 28 converts a file managed by the migration-source document management system 17. The conversion settings are configured, for example, by using a setting screen depicted in FIG. 7. In the example depicted in FIG. 7, settings including a method to convert a file that is to be migrated from the migration-source document management system 17 to the migration-destination document management system 18 are configured. Specifically, a conversion method is specified by selecting any of "No Conversion", "Compression", "One Page Only", "Index Image", and "Printed Image" in the "Conversion Option" section. One or more conversion targets are specified by selecting any of "Specify Based on Registration Date and Time", "Specify Based on Access Date and Time", "Specify Based on Attribute Value", and "Latest Version" in the "Method to Specify Conversion Target" section. A compression method is set by specifying any of "Lossy Compression (Image Size Reduced) 50% Reduction", "Lossy Compression (No Change in Image Size)", and "Lossless Compression" in the "Compression Method" section. In the setting screen depicted in FIG. 7, "Estimated Amount of Time for Migration" (20 hours and 30 minutes for the example in FIG. 7) is calculated based on the specified setting conditions and displayed.

Figure 8:
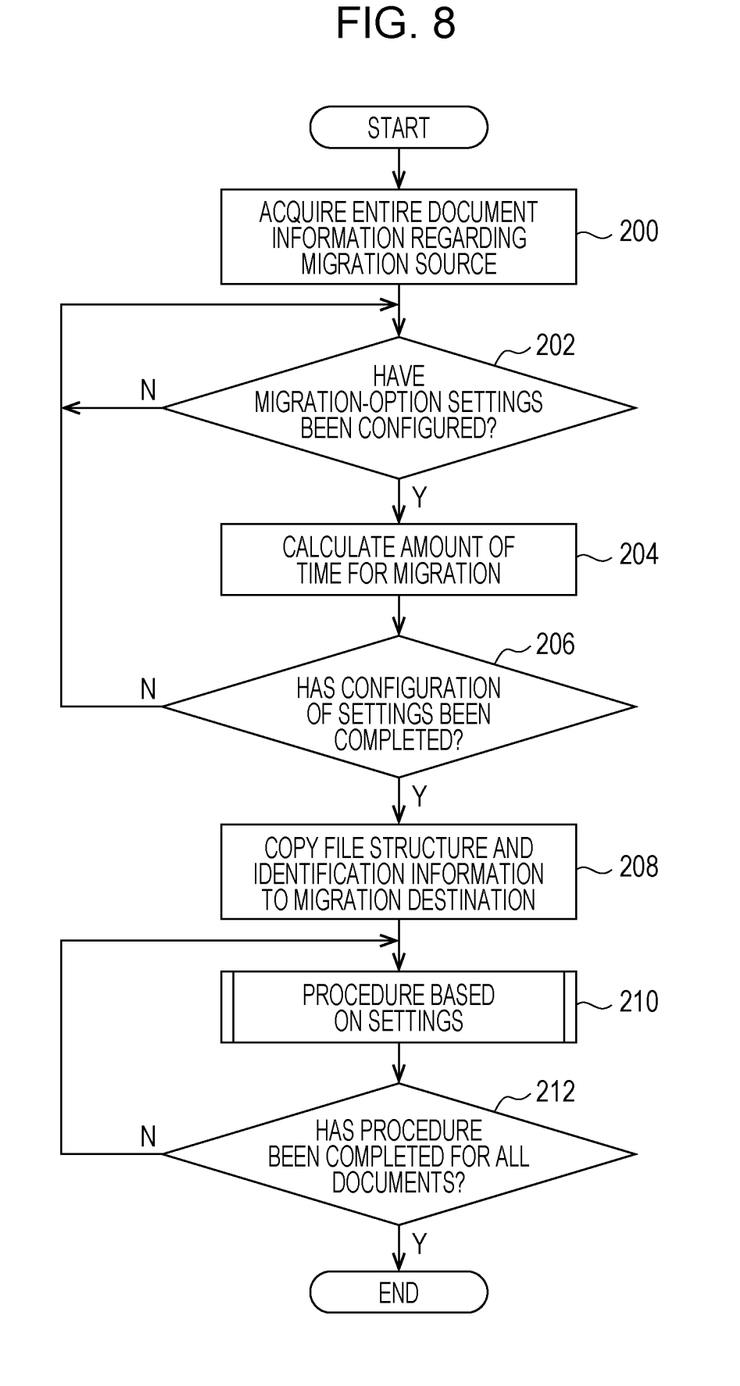
FIG. 8 is a flowchart depicting an example flow of a process performed by a system migration service of a cloud server in the information processing system according to the second exemplary embodiment.

Next, a process performed by the system migration service 20 of the cloud server 14 in the information processing system 10 according to the present exemplary embodiment, the information processing system 10 being configured as described above, will be described. FIG. 8 is a flowchart depicting an example flow of a process performed by the system migration service 20 of the cloud server 14 in the information processing system 10 according to the present exemplary embodiment. The process depicted in FIG. 8 starts, for example, when a user specifies the migration-source document management system 17 and the migration-destination document management system 18 and provides instructions to migrate the system.

In step 200, the acquisition unit 22 acquires entire document information regarding the migration-source document management system 17, and the process proceeds to step 202. Specifically, the acquisition unit 22 acquires a file structure, identification information, the number of files, file sizes, file attributes, and the like as the entire document information.

Figure 7:
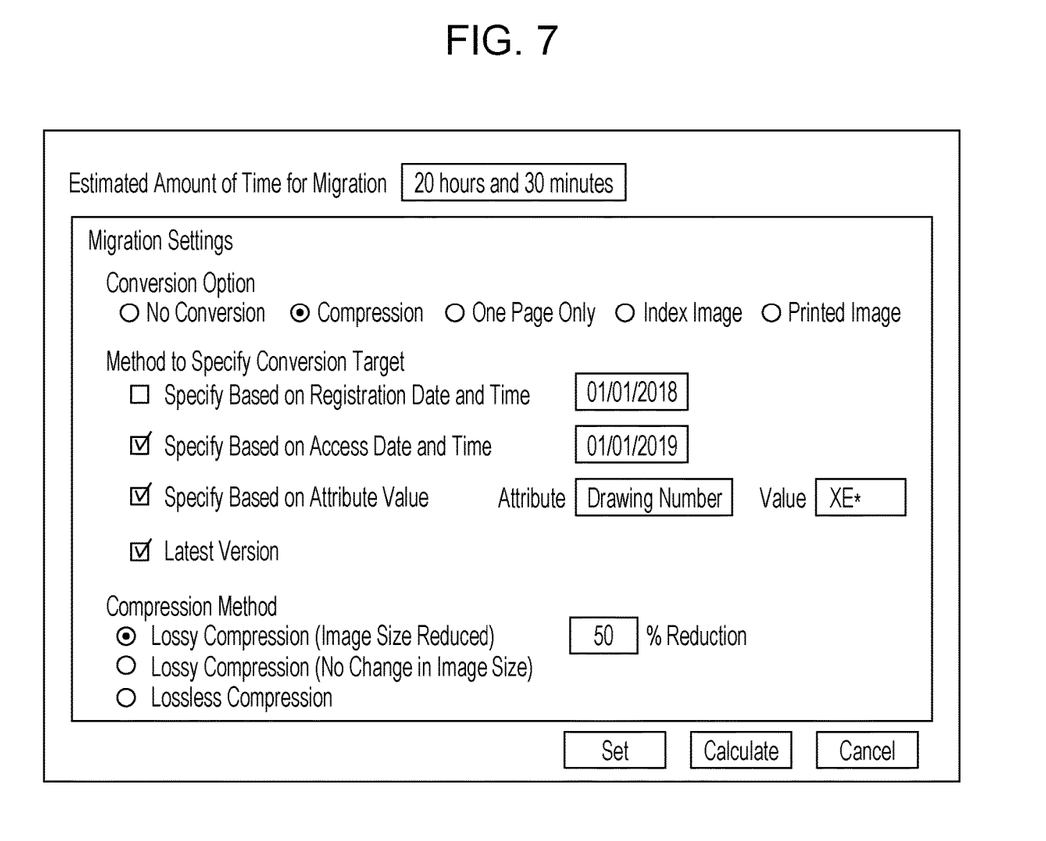
FIG. 7 is an illustration depicting an example of a setting screen.

In step 202, the file converter 28 determines whether migration-option settings have been configured. For example, it is determined whether a user has operated the setting screen, which is depicted in FIG. 7, and an operation corresponding to "Calculate" depicted in FIG. 7 has been performed. The process waits until an affirmative determination is made in step 202 and proceeds to step 204.

In step 204, the file converter 28 calculates the amount of time for migration by using the entire document information, and the process proceeds to step 206. In this way, "Estimated Amount of Time for Migration" is displayed in the setting screen, which is depicted in FIG. 7. Step 204 corresponds to an operation performed by a display unit.

In step 206, the file converter 28 determines whether the configuration of the settings has been completed. In other words, it is determined whether the user has finished configuring the settings by using the setting screen, which is depicted in FIG. 7, and an operation corresponding to "Set" depicted in FIG. 7 has been performed. If an affirmative determination is made in step 206, the process proceeds to step 208. If the user has changed the settings and a negative determination is made in step 206, the process returns to step 202 and repeats the above procedure.

In step 208, the copying unit 26 uses the entire document information, which is acquired by the acquisition unit 22, and copies to the migration-destination document management system 18 the file structure and the identification information to identify a file, and the process proceeds to step 210.

In step 210, the file converter 28 performs a procedure based on the settings, which have been configured in the setting screen, and the process proceeds to step 212. Details on the procedure based on the settings will be described below.

In step 212, the file converter 28 determines whether a procedure based on the settings has been completed for all the documents. If a negative determination is made in step 212, the process returns to step 210 and repeats the above procedure. If an affirmative determination is made in step 212, the process completes a series of procedures.

Figure 9:
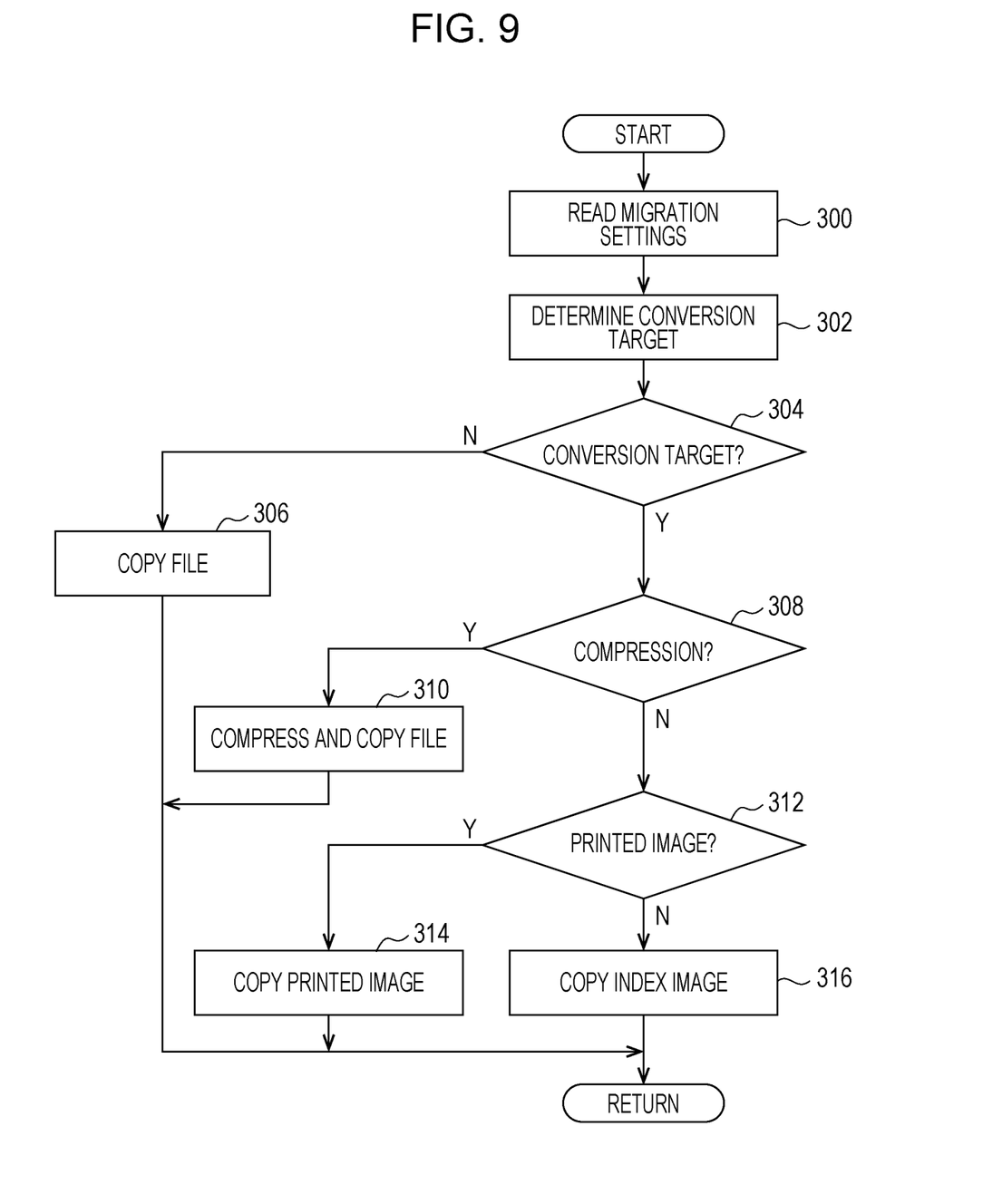
FIG. 9 is a flowchart depicting an example flow of a process based on settings configured by the system migration service of the cloud server in the information processing system according to the second exemplary embodiment.

A detailed process flow that is performed in step 210 above and that is based on the settings will be described. FIG. 9 is a flowchart depicting an example flow of a process based on the settings configured by the system migration service 20 of the cloud server 14 in the information processing system 10 according to the present exemplary embodiment. The process based on the settings is assumed to focus on and be performed for each file in the migration-source document management system 17.

In step 300, the file converter 28 reads migration settings, and the process proceeds to step 302. Specifically, the settings configured in the setting screen, which is depicted in FIG. 7, are read.

In step 302, the file converter 28 determines a conversion target in accordance with the settings, which have been read, and the process proceeds to step 304.

In step 304, the file converter 28 determines whether a file is a conversion target. The file converter 28 determines whether a file that is a focus of attention is a conversion target specified in the setting screen. If a negative determination is made in step 304, the process proceeds to step 306. If an affirmative determination is made in step 304, the process proceeds to step 308.

In step 306, since the file that is a focus of attention is not a conversion target, the copying unit 26 copies the file to a corresponding location of the file structure and the identification information, which have been copied to the migration-destination document management system 18. Then, the process finishes the procedure based on a series of settings to return to the original flow and proceeds to step 212, which is described above.

In step 308, the file converter 28 determines whether the conversion method specified for the file is "Compression". If an affirmative determination is made in step 308, the process proceeds to step 310. If a negative determination is made in step 308, the process proceeds to step 312.

In step 310, the file converter 28 compresses the file that is a focus of attention, and the copying unit 26 copies the compressed file to a corresponding location of the file structure and the identification information, which have been copied to the migration-destination document management system 18. Then, the process finishes the procedure based on a series of settings to return to the original flow and proceeds to step 212, which is described above.

In step 312, the file converter 28 determines whether the specified conversion method is "Printed Image". If an affirmative determination is made in step 312, the process proceeds to step 314. If a negative determination is made in step 312, the process proceeds to step 316.

In step 314, the file converter 28 converts the file that is a focus of attention into a printed image, and the copying unit 26 copies the printed image, which is obtained by the conversion, to a corresponding location of the file structure and the identification information, which have been copied to the migration-destination document management system 18. Then, the process finishes the procedure based on a series of settings to return to the original flow and proceeds to step 212, which is described above.

In step 316, the file converter 28 converts the file that is a focus of attention into an index image, and the copying unit 26 copies the index image, which is obtained by the conversion, to a corresponding location of the file structure and the identification information, which have been copied to the migration-destination document management system 18. Then, the process finishes the procedure based on a series of settings to return to the original flow and proceeds to step 212, which is described above.

In this way, since one or more files in the migration-source document management system 17 are converted in accordance with the settings and then copied to the migration-destination document management system 18, the amount of time that it takes to migrate all the files is reduced compared with the case where content data of all the files is copied with no change.

The first exemplary embodiment and the second exemplary embodiment may be combined, and both of the creation of the recognition information by the creation unit 24 in the first exemplary embodiment and the file conversion by the file converter 28 in the second exemplary embodiment may be performed.

The system migration from the server 16 to the cloud server 14 is described as an example in each of the above exemplary embodiments, but this is not meant to be limiting. For example, the above exemplary embodiments may be applied to a system migration between two of the servers 16 on premises or to a system migration between two of the cloud servers 14.

The process performed by the cloud server 14 according to each of the above exemplary embodiments may be a process performed by using software, a process performed by using hardware, or a process performed by using a combination of software and hardware. The process performed by the cloud server 14 may be stored in a recording medium as a program and distributed by using the recording medium.

The present disclosure is not limited to the above embodiments, and various modifications other than the above embodiments may obviously be practiced as long as they do not depart from the spirit of the disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a processor programmed to:
        acquire a file structure at a migration source and identification information to identify a file at the migration source;
        create recognition information for the file with which content of the file is recognizable, the recognition information being created based on content of the file, and the recognition information being an image that corresponds to the content of the file;
        copy the file structure and the identification information to a migration destination;
        store the recognition information at the migration destination, after the file structure and the identification information has been copied; and
        migrate content data of one or more files to the migration destination, after the recognition information is stored.

2. The information processing apparatus according to claim 1,
    wherein the processor is programmed to create the recognition information at the migration destination if the recognition information is not present at the migration source.

3. The information processing apparatus according to claim 2,
wherein the processor is programmed to create the recognition information by downsizing a file at the migration source.

4. The information processing apparatus according to claim 2, wherein the processor is programmed to function as:
a converter that converts a file at the migration source in accordance with a conversion setting that is configured in advance,
wherein the file converted by the converter is migrated to the migration destination.

5. The information processing apparatus according to claim 1,
wherein the processor is programmed to create the recognition information by downsizing a file at the migration source.

6. The information processing apparatus according to claim 1, wherein the processor is programmed to function as:
a converter that converts a file at the migration source in accordance with a conversion setting that is configured in advance,
wherein the file converted by the converter is migrated to the migration destination.

7. The information processing apparatus according to claim 6, further comprising:
a display controller that controls to display an amount of time that migration to the migration destination takes, the migration being performed after conversion is performed by the converter in accordance with the conversion setting.

8. The information processing apparatus according to claim 1, wherein the processor is programmed to:
acquire content data of a file at the migration source; and
copy the content data at the migration source to a corresponding location of the file structure, the content data being acquired by the processor, the file structure being copied to the migration destination by the processor.

9. The information processing apparatus according to claim 1, wherein the processor is programmed to function as:
a migration-destination manager that serves as the migration destination and that manages a plurality of files.

10. An information processing system comprising:
an information processing apparatus including a processor programmed to:
acquire a file structure at a migration source and identification information to identify a file at the migration source;
create recognition information for the file with which content of the file is recognizable, the recognition information being created based on content of the file, and the recognition information being an image that corresponds to the content of the file;
copy the file structure and the identification information to a migration destination;
store the recognition information at the migration destination, after the file structure and the identification information has been copied; and
migrate content data of one or more files at to the migration destination, after the recognition information is stored; and
a migration-source manager that serves as the migration source and that manages a plurality of migration target files in a predetermined file structure together with identification information to identify a file.

11. A non-transitory computer readable medium storing a program causing a computer to execute a process for information processing, the process comprising:
acquiring a file structure at a migration source and identification information to identify a file at the migration source;
creating recognition information for the file with which content of the file is recognizable, the recognition information being created based on content of the file, and the recognition information being an image that corresponds to the content of the file;
copying the file structure and the identification information to a migration destination;
storing the recognition information at the migration destination, after the file structure and the identification information has been copied; and
migrating content data of one or more files to the migration destination, after the recognition information is stored.

* * * * *